United States Patent [19]

Cofield

[11] Patent Number: 4,672,191
[45] Date of Patent: Jun. 9, 1987

[54] SHADOW SOLAR TRACKING DEVICE AND SYSTEM

[76] Inventor: Dennis Cofield, 2817 Roy Pace, El Paso, Tex. 79935

[21] Appl. No.: 622,212

[22] Filed: Jun. 19, 1984

[51] Int. Cl.⁴ .............................................. G01J 1/20
[52] U.S. Cl. .................................................. 250/203 R
[58] Field of Search ....................... 356/213, 222, 225; 250/203 S, 237 R; 126/424, 425

[56] References Cited

U.S. PATENT DOCUMENTS

| | | | |
|---|---|---|---|
| 4,316,084 | 2/1982 | Stout | 250/203 S |
| 4,498,767 | 2/1985 | McGovern et al. | 250/237 R |
| 4,549,078 | 10/1985 | Monahan | 250/203 R |

Primary Examiner—Gene Wan
Attorney, Agent, or Firm—Flehr, Hohback, Test, Albritton & Herbert

[57] ABSTRACT

A solar tracking device (10) has a shadow plate (12) mounted above support (14). A first pair of photoresponsive sensors (18) is mounted beneath the shadow plate (12). A second pair of photoresponsive sensors (20) is also mounted beneath the shadow plate (12), with a line passing through the second pair of photoresponsive sensors (20) being at an angle to a line passing through the first pair of photoresponsive sensors (18). A fifth photoresponsive sensor (21) is mounted above the shadow plate (12) in a cylindrical enclosure (23). Each of the sensors (18, 20, 21) has a microscopic opening (22) which admits light to the sensors. A "no-hunt" control circuit (100) receives inputs from each of the first and second pairs of sensors (18 and 22) to control operation of positioning motors (134 and 136). Coincidence of inputs from each sensor (18 or 20) and a clocking signal (192) are used to inhibit inputs from each sensor (18 or 20) to motors (134 and 136). The fifth sensor (21) is used to control operation of a pump (206) for a heat transfer fluid. A drive mechanism (300) for a parabolic solar energy receiver (202) has a nut (320) threaded on a drive screw (316). The nut (320) is mounted on orthogonal pivots (324, 385). A support (322) for the drive screw (316) and a drive motor (318) is also mounted on orthogonal pivots (326, 410).

21 Claims, 11 Drawing Figures

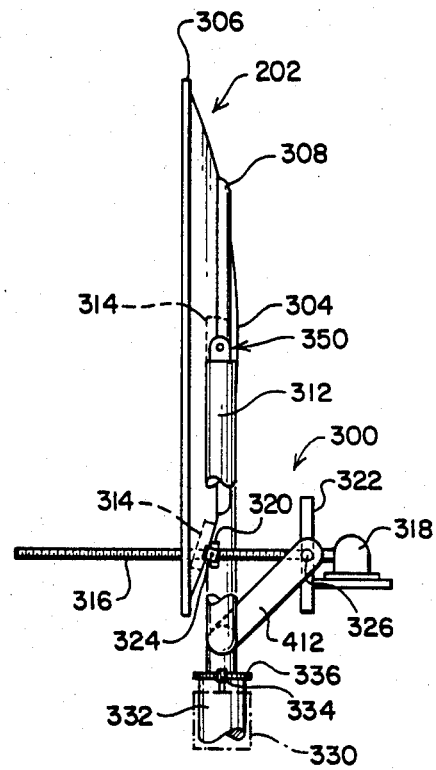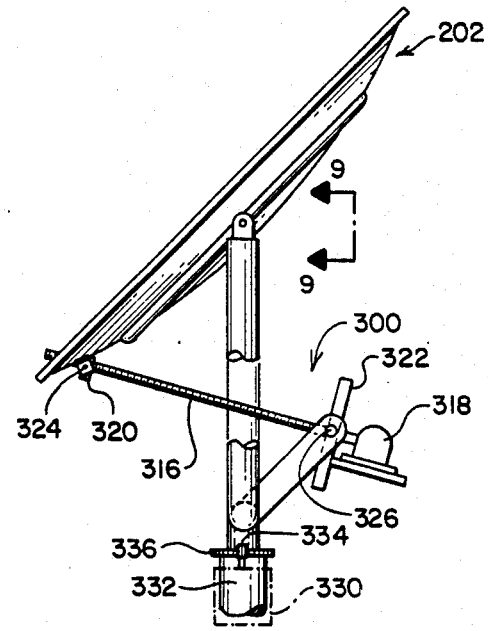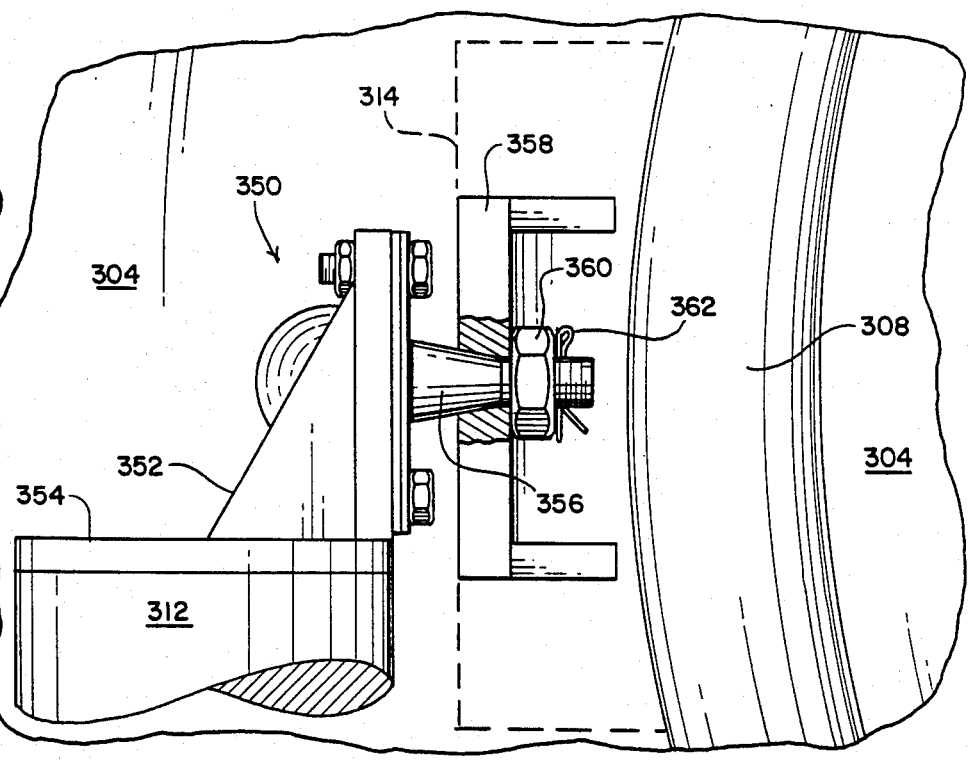

SHADOW SOLAR TRACKING DEVICE AND SYSTEM

BACKGROUND OF THE INVENTION

1. Field of the Invention

This invention relates to a novel solar tracking device and system which provides both a high level of accuracy and wide angle target finding capabilities. More particularly, it relates to such a device which may be incorporated into a system which eliminates continuous hunting by the tracking device during operation.

2. Description of the Prior Art

There are a variety of solar tracking devices and systems known in the art. For example, Napoli et al., U.S. Pat. No. 4,041,307, issued Aug. 9, 1977 discloses a quadrant detector employing shadowing, which is especially suited for use with solar photovoltaic arrays. However, the detector there disclosed is not suited for use with focused parabolic solar collectors, because such collectors require a much higher degree of accuracy in tracking the sun than is required in the case of photovoltaic arrays. Certain conditions, such as a partly cloudy sky, which produces a large amount of reflected light impinging on the sensors of such a detector, cause severe reduction in accuracy of the system there disclosed.

Other examples of solar tracking devices employing shadowing are disclosed in the following issued U.S. Pat. Nos.: Trihey, 3,996,917, issued Dec. 14, 1976; Haywood et al., 4,082,947, issued Apr. 4, 1978; Winders, 4,107,521, issued Aug. 15, 1978; Neale, 4,146,785, issued Mar. 27, 1979; Brown et al., 4,151,408, issued Apr. 24, 1979; Smith, 4,179,612, issued Dec. 18, 1979. Another example of such a device is disclosed in Pages, French Patent Publication No. 2,257,067, published Aug. 1, 1975.

All of these tracking devices suffer from one or more of the following problems: inability to find the sun from a wide angle off-target; not sufficiently accurate to allow use of a small heat receiver, such as is desired with a parabolic reflector; oscillation across desired attitude, causing motor wear, gear wear and energy consumption; inability to operate in both bright sun and hazy sun. An approach common to many of these devices is to set sensing circuits connected to the devices to respond only when the sensed light is above a relatively high threshold, either through use of biasing resistors or optical filters. This avoids problems associated with high light levels, but produces poor response when the sun is dim. Setting the sensing circuits to respond to a low level of detected light causes problems in bright sunlight.

The above-mentioned U.S. Pat. No. 4,107,521 also discusses the problem of excessive hunting in solar tracking systems. The approach there disclosed for reducing excessive hunting is to reduce tracking speed of the solar energy device to attempt to eliminate overshoot. However, any tracking system set for a very high level of sensitivity will continually hunt back and forth across the target in an arc of greater or lesser size. The reduced tracking speed used in U.S. Pat. No. 4,107,521 will reduce the arc length of the constant overshoot but will not stop the continuous hunting. Further, the approach employed in this patent will not prevent motor jitter and buzz during windy conditions, when optics are being vibrated.

A variety of photodectors are known, in addition to those disclosed in the above patents. For example, NASA Tech Briefs, Vol. 7, No. 1, Fall 1982, p. 78 discloses a photodetector especially adapted for use in a joystick controller.

Various aspects of solar reflectors, support structures for such solar reflectors, drive mechanisms for causing such reflectors to track the sun, and heating systems incorporating such solar reflectors are also disclosed in the following issued U.S. Pat. Nos.: Whitaker, 3,234,931, issued Feb. 15, 1966; Carter et al, 3,305,606, issued Feb. 21, 1967; Hoham, 3,394,054, issued July 23, 1968; Hubbard, 3,977,773, issued Aug. 31, 1976; Kume, 4,034,737, issued July 12, 1977; Fletcher et al, 4,044,753, issued Aug. 30, 1977; Bottum et al, 4,044,948, issued Aug. 30, 1977; Gonzales, 4,061,130, issued Dec. 6, 1977; Brokaw, 4,098,264, issued July 4, 1978; Bottum, 4,130,110, issued Dec. 19, 1978; Raser, 4,147,414, issued Apr. 3, 1979; Winninger, 4,158,356, issued June 19, 1979; Monk, 4,161,942, issued July 24, 1979; Hutchison, 4,178,913, issued Dec. 18, 1979.

As exemplified in these prior art patents, tracking solar collectors and heating systems incorporating such solar collectors have been largely experimental. None have achieved mass production for a variety of reasons. In order to achieve mass production, such tracking solar collectors and their heating systems must meet a number of criteria. The system must be large enough to supply an adequate amount of energy. It must be strong and reliable in operation when subjected to high winds. It must be simple in design to facilitate manufacture and installation by relatively unskilled personnel. The parabolic reflector should be of high optical quality, with a true undistorted parabolic surface. The systems exemplified in the above prior art patents have not met these criteria to a sufficient degree for mass production.

In particular, a shortcoming of prior art systems is that they tend not to utilize mechanical balance. Prior art mechanisms typically include offset pivots, with substantial lever lengths, which increase power requirements for positioning the parabolic reflector. Also, prior art supporting and tracking mechanisms require alignment of moving parts to close tolerances if they are to function without binding or requiring the use of relatively large motors for positioning.

Thus while the art of solar tracking devices, solar reflectors incorporating such tracking devices, drive mechanisms for such tracking solar reflectors and solar heating systems incorporating such tracking solar reflectors is a well developed one, a need still remains for further improvements in such systems, in order to meet requirements for mass production.

SUMMARY OF THE INVENTION

Accordingly, it is an object of this invention to provide a tracking device for a solar energy system which is able to find the sun from a wide angle off target in an improved manner.

It is another object of the invention to provide an improved solar tracking device and system sufficiently accurate under a wide variety of operating conditions to allow its use with a small solar heat receiving device.

It is still another object of the invention to provide a solar energy system that will allow efficient use of extremely small heat receiver devices in a focused tracking system.

It is a further object of the invention to provide a solar tracking system which will eliminate constant oscillation across a desired attitude in operation of the system.

It is still another object of the invention to provide such a solar tracking device and system which will operate in both bright sun and hazy sun with a high degree of accuracy.

It is yet another object of the invention to provide such a solar tracking device and system which will maintain a high differential of light levels between two sensors on any axis of tracking.

It is a further object of the invention to provide a tracking solar reflector system of high optical quality and simplified construction that can be mass produced.

It is another object of the invention to provide a low power drive system for a tracking solar reflector which does not require the fabrication of precision parts.

The attainment of these and related objects may be achieved through the novel shadow solar tracking device and system herein disclosed. A shadow solar tracking device in accordance with this invention has a shadowing plate mounted above a suitable support. Two opposing photoresponsive sensors are mounted in proximity to the shadow plate, with the shadow plate between the opposing sensors and the sun. The first pair of opposing sensors is used for elevation tracking. A second set of opposing sensors is positioned beneath the shadow plate in a line orthogonal to a line joining the first pair of opposing sensors. The second pair of opposing sensors is for azimuth tracking. A fifth, "well" mounted sensor may also be used to determine solar lock-on for starting and stopping pumps or other equipment. Each of the sensors used employs a cover having a small opening over each sensor for the purpose of directing sunlight to each sensor.

In operation, the well prevents the lock-on sensor from turning on the pump when the sun is shining unless the parabolic reflector or other solar energy device is in near perfect alignment with the sun. The angle of misalignment at which the pump will run is determined by the predetermined depth of the well.

A system in accordance with this invention incorporates a novel "no-hunt" logic circuit which prevents the system from engaging in constant hunting, while maintaining a high degree of accuracy and sensitivity. The logic circuit may be used with other types of tracking devices, and the shadow plate tracking device may be used with other forms of logic circuits. The no-hunt logic circuit employs a clock, a pair of latches for each axis of tracking, and a logic gate for each axis of tracking. Inverters may or may not be required in the circuit, depending on the type of elements employed in the circuit.

In another aspect of the invention, a solar energy system includes a solar energy receiver and a first drive mechanism connected to pivot the solar energy receiver in a first direction to follow apparent solar motion. The first drive mechanism has a drive screw and a mating threaded member mounted on the drive screw. The mating threaded member is fixed to prevent rotation with respect to the drive screw. The mating threaded member is pivotably mounted on two orthogonally disposed pivots attached to the solar energy receiver. A drive motor is coupled to turn the drive screw. The drive screw and drive motor are mounted on a support. The support is pivotally mounted on two orthogonally disposed pivots attached to a base which is fixed relative to the solar energy receiver. A solar tracking device is connected to control operation of the first drive mechanism. In practice, a second drive mechanism is provided in the system, connected to pivot the solar energy receiver in a second direction to follow apparent solar motion. As a result of the pivoting action of the mating threaded member and the pivotally mounted support for the drive motor and drive screw, smooth operation of the drive mechanism is assured, so that only a small drive motor need be used in the drive mechanism.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIGS. 7 and 8 are side views of a parabolic reflector, support assembly and drive mechanism in accordance with the invention.

FIG. 9 is an enlarged side view of a portion of the support assembly in FIGS. 7 and 8.

DETAILED DESCRIPTION OF THE INVENTION

Figure 1:
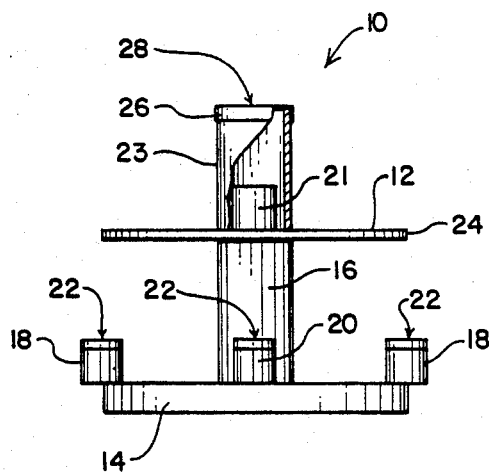
FIG. 1 is a cross-section view of a shadow solar tracking device in accordance with the invention.
Figure 2:
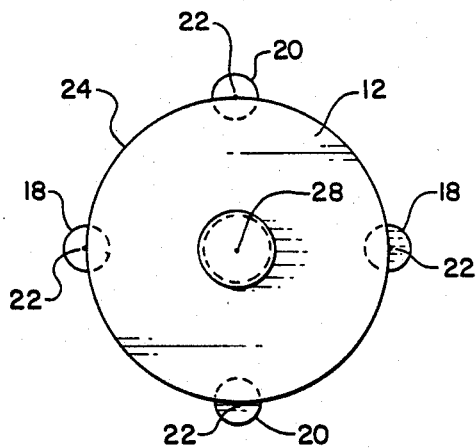
FIG. 2 is a top view of the shadow solar tracking device shown in FIG. 1.

Turning now to the drawings, more particularly to FIGS. 1 and 2, a solar tracking device 10 in accordance with the invention is shown. The device 10 includes a shadow plate 12 mounted on support 14 by means of pedestal 16. A first pair of photodetectors 18 are mounted beneath the plate 12 along one tracking axis for the device. A second pair 20 of photodetectors is mounted beneath the plate 12 along the second tracking axis. Typically, the two tracking axes are orthogonally disposed with respect to one another. A fifth detector 21 is mounted on top of the shadow plate 12, within a cylindrical well 23. As is best shown in FIG. 2 of the drawings, a microscopic hole 22 for each of the detectors 18 and 22 is positioned to be covered by, but near edge 24 of the shadow plate 12. Cover 26 of the well 23 has a similar microscopic aperture 28.

Figure 3:
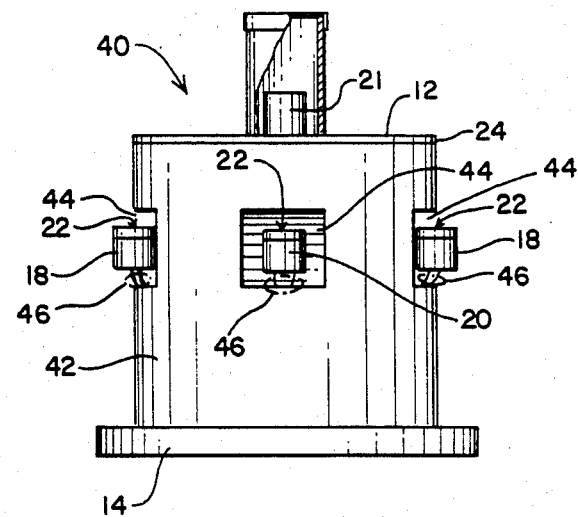
FIG. 3 is a cross-section view of another embodiment of a shadow solar tracking device in accordance with the invention.

In the embodiment of FIG. 3, the solar tracking device 40 has its shadow plate 12 mounted on support 14 by means of cylinder 42. Each of the photodetectors 18 and 20 are connected to recesses 44 within the cylinder 42 by means of flexible wires 46. Other forms of flexible attachment for the photodetectors 18 and 20 could be employed if desired. In other respects, the design and operation of the FIG. 2 embodiment is the same as the FIG. 1 embodiment of the invention. In operation, the flexible wires 46 allow the photodetectors 18 and 20 to be positioned with their microscopic holes 22 disposed to a greater or lesser extent under the edge 24 of shadow plate 12.

Figure 4:
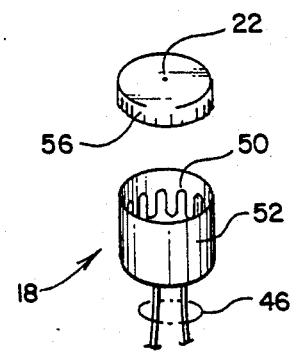
FIG. 4 is an exploded perspective view of a sensor employed in the shadow solar tracking devices of FIGS. 1-3.

FIG. 4 is an exploded perspective view of one of the photodetectors 18 shown in FIGS. 1-3. The photodetector 18 includes a photosensitive element 50 mounted within base 52. Lead wires 46 extending from the base 52 are connected to the photosensitive element 50. A foil cap or iris 56 having a microscopic hole 22 in its center is positioned over the photosensitive element 50 on the base 52.

Figure 5:
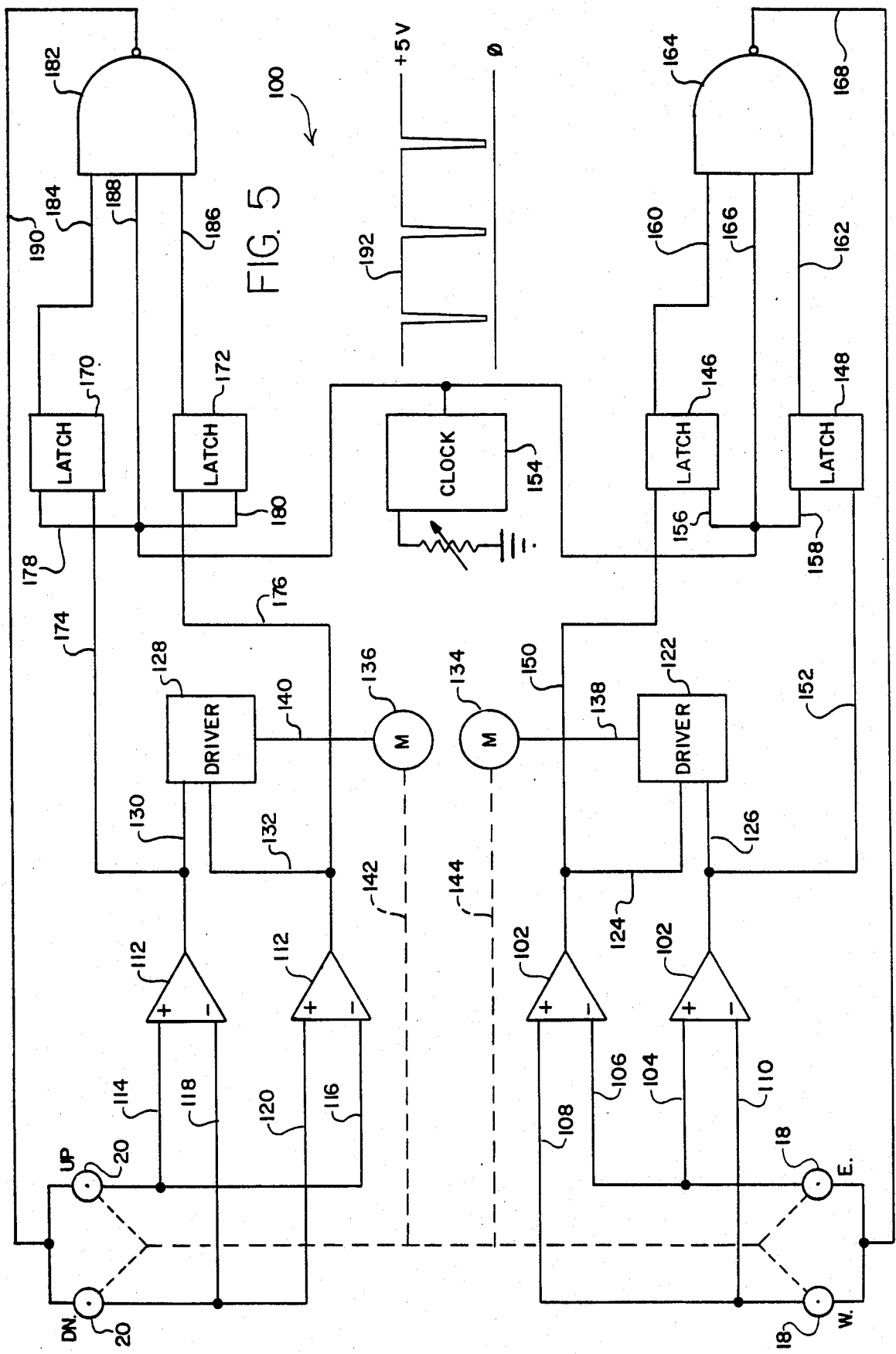
FIG. 5 is a block and circuit schematic diagram of a no-hunt logic circuit in accordance with the invention, used in system of the invention incorporating the tracking devices and sensors shown in FIGS. 1-4.

FIG. 5 shows a "no-hunt" logic circuit 100 which may be connected to the detectors 18 and 20 of FIGS. 1-4 to give a solar tracking system in accordance with the invention. Detectors 18 have their outputs respectively connected to the positive and negative terminals of amplifiers 102 by lines 104, 106, 108 and 110. Similarly, the detectors 20 have their outputs respectively connected to the positive and negative terminals of amplifiers 112 by lines 114, 116, 118 and 120. The outputs of the amplifiers 102 are each connected to motor drive circuit 122 by lines 124 and 126. Similarly, the outputs of amplifiers 112 are each connected to motor drive circuit 128 by lines 130 and 132. The outputs of the motor drive circuits 122 and 128 are each connected to a motor 134 and 136 by lines 138 and 140. Motors 134 and 136 are mechanically coupled to move a solar energy collector device, as indicated by dotted lines 142 and 144. Since the detectors 18 and 20 are also mounted on the solar energy collection device, they are also moved by the motors 134 and 136.

The outputs of amplifiers 102 are each also connected to latches 146 and 148 by lines 150 and 152. The other inputs to the latches 146 and 148 are supplied by clock circuit 154 on lines 156 and 158. The outputs of latches 146 and 148 are respectively supplied on lines 160 and 162 as inputs to NAND gate 164. The other input to NAND gate 164 is supplied by the clock circuit 154 on line 166. The output of NAND gate 164 is supplied on line 168 as a disabling input to the detectors 18 when the output of NAND gate 164 is low.

Similarly, the outputs of amplifiers 112 are respectively supplied as inputs to latches 170 and 172 on lines 174 and 176. The other inputs to latches 170 and 172 are supplied by clock circuit 154 on lines 178 and 180. The outputs of latch circuits 170 and 172 are supplied as inputs to NAND gate 182 on lines 184 and 186. The remaining input to NAND gate 182 is supplied by the clock circuit 154 on line 188. The output of NAND gate 182 is supplied on line 190 as a disabling input to detectors 20 when the output of NAND gate 182 is low. The NAND gates 164 and 182 respectively disable horizontal and vertical tracking in a system incorporating the circuit 100. The clock signals supplied on lines 156, 158, 166, 178, 180 and 188 are shown by wave form 192.

In operation of the no-hunt circuit 100, as the sun rises, a drive up signal is sensed at latch 170, causing its output to go high and remain high. When the motor 136 tries to reverse, a drive down signal is sensed at latch 172, causing its output to go high and remain high. When NAND gate 182 senses these two high outputs and the high clock signal 192, the output on line 190 goes low and remains there. A low output on line 190 disables the vertical drive motor 136 and tracking amplifiers 112 for the duration of the clock pulse. This action prevents any hunting caused by overshoot or high wind vibration of the platform and optics. The clock pulse 192 will fall from high to low, allowing latches 170, 172 to go low, thus producing a high output on line 190 from NAND gate 182. By this time, the sun may have drifted a fraction of a degree and the tracking system is free to correct accordingly. Operation of the east-west (azimuth) tracking action of latches 146, 148, NAND gate 164 and azimuth drive motor 134 is the same as for the vertical tracking elements. In practice, both the vertical and horizontal (elevation and azimuth) drivers 128 and 122 employ one second or more delay timers. This prevents the motors from reversing before the circuit 100 has time to shut down the system.

Figure 6:
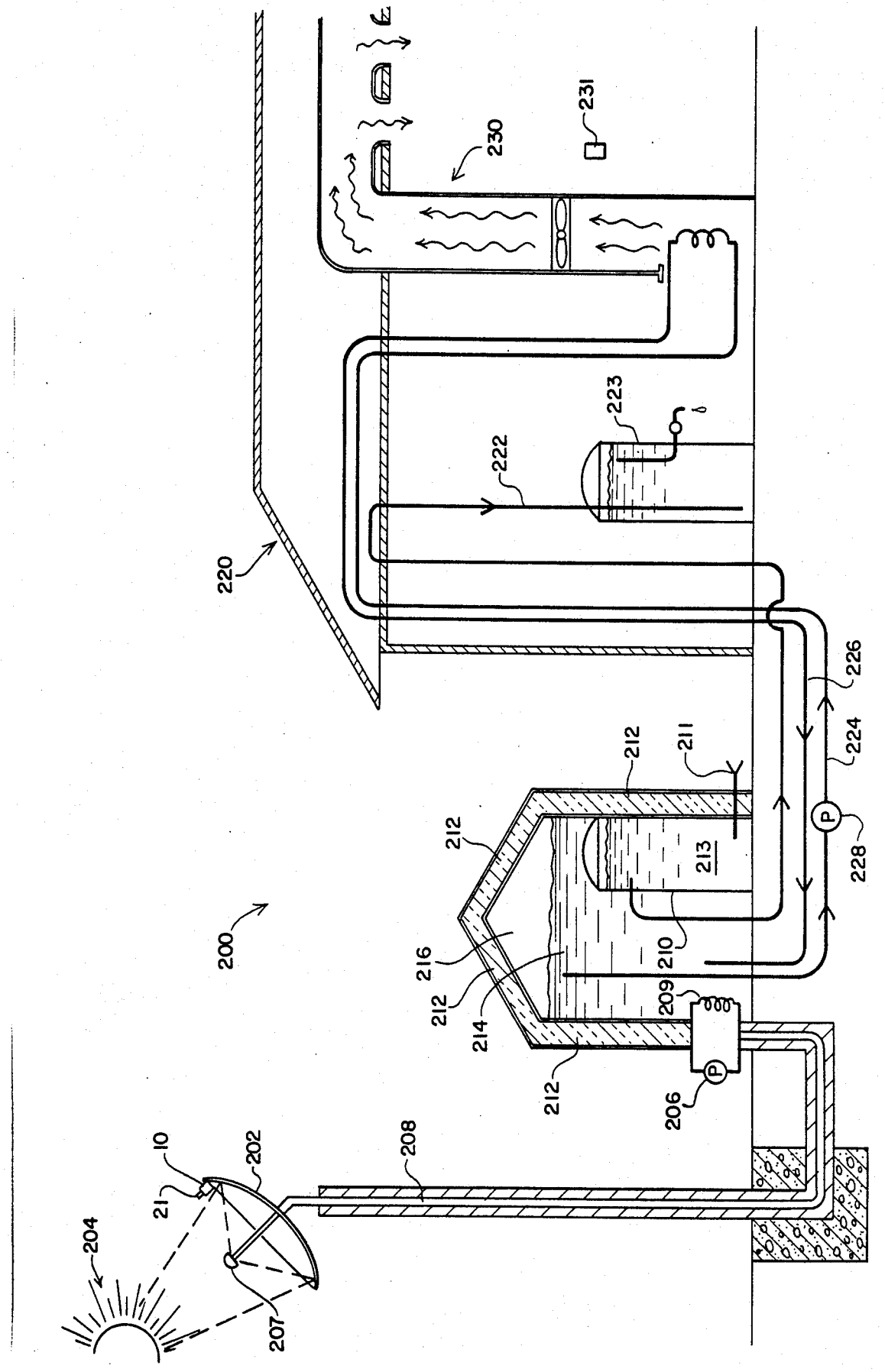
FIG. 6 is a schematic diagram of a solar energy system in accordance with the invention.

FIG. 6 is a schematic diagram of a solar heating system 200 in accordance with the invention. A parabolic solar reflector 202 is mounted for elevation and azimuth tracking of sun 204. A solar tracking device 10 as shown in FIGS. 1, 2 and 4 is mounted on the parabolic reflector 202. The well sensor 21 of the tracking device 10 is connected to control operation of pump 206, so that the pump 206 operates only when sun 204 is shining and the parabolic reflector 202 is in alignment with the sun 204. In operation, the parabolic reflector 202 heats water or another suitable heat exchange fluid in heat receiver 207. Fluid is passed through pipe 208 by pump 206 to heat exchanger 209 which transfers heat to water 214.

High temperatures are maintained in water 214 by use of insulating blanket 212 on reservoir 216. Cold water from a domestic water system (not shown) enters tank 210 by line 211. Water 213 in submerged tank 210 is heated through metal walls of tank 210 by solar heated water 214. Potable hot water from tank 210 is passed through line 222 to oil, gas or electric fired hot water heater 223 in building 220. External energy sources (oil, gas or electric) will automatically maintain temperature in tank 223 in the case of extended cloudy weather.

On demand from thermostat 231, pump 228 causes hot water 214 to circulate through lines 224 and 226 to heating and air conditioning system 230. When used in the cooling mode, air conditioning system 230 is a conventional lithium bromide absorption chiller designed to operate at hot water temperatures of 190° F. or less. Heating and air conditioning system 230 employs oil, gas or electrical energy backup in case of extended cloudy weather.

In operation, the well sensor 21 allows pump 206 to operate when the parabolic reflector 202 is nearly on target, allowing light from the sun 204 to penetrate the microscopic iris of the well sensor 21. If desired, the well sensor 21 can be flush mounted, and the sensors 18, 20, 21 of the detector could be located anywhere on the parabolic reflector. When the parabolic reflector 202 is not facing or nearly facing the sun 204, a shadow is cast by the well 23, causing the pump 206 to shut down. On overcast days when the sky is extremely bright but the sun 204 is not visible, the pump 206 will not run, since the microscopic iris of the sensor 21 prevents the sensor from receiving enough light for operation of the pump 206. Use of the well sensor 21 eliminates the need for precision sensitivity adjustments of a pump control amplifier, while ensuring that the pump runs when needed and shuts down when not needed.

FIGS. 7 and 8 show a vertical drive mechanism 300 for the parabolic reflector 202. The reflector 202 is formed from a parabolic shape 304, fabricated from fibreglass in a conventional laying up process. A rim 306, integrally formed from the fiberglass, and a 4" diameter ring 308 of fiberglass, in a circular configuration, bonded to the back of the parabolic shape 304 during lay-up, give rigidity to the parabolic shape 304.

In practice, the parabolic shape is ⅛" thick, with a diameter of 14 ft. and has near perfect optical quality. The rim 306 is 2½" high and ¼" thick. Most of the rigidity of the parabolic shape is imparted by the ring 308.

During lay-up, a pair of sheet metal plates with mountings for a ball joint are embedded in the parabolic shape 304 on opposite sides of the parabolic shape 304, to provide pivoting support for the parabolic reflector 202 on a generally Y-shaped yoke 312, which extends upward on either side of the parabolic shape 304.

The drive mechanism 300 for the parabolic reflector 202 includes a 6 ft. long, 1½" diameter screw 316, driven by motor 318. A nut 320, which is pivotable in two orthogonal axes, is mounted on the parabolic reflector 202 and threaded to the screw 316. Drive motor 318 for the screw 316 is fixedly attached to plate 322, which is pivotally attached to mounting members 412, which are fixedly attached to yoke 312 to allow the plate 322 to pivot in two orthogonal axes as well.

FIGS. 7 and 8 show the parabolic reflector 202 in two different positions as a result of operation of the drive mechanism 300. As screw 316 is turned clockwise by motor 318, nut 320 moves away from motor 318 on screw 316. As a result, parabolic reflector 202 moves from the vertical position shown in FIG. 7 to the angled position shown in FIG. 8. During this movement, nut 320 pivots with respect to the parabolic reflector 202 about its horizontal pivot points 324. Similarly, the screw 316 and motor 318 pivot with respect to yoke 312 about the horizontal pivot points 326 of the plate 322.

A horizontal drive motor 330 is mounted near support pole 332 to drive gear 334, which meshes with gear 336 to pivot the parabolic reflector 202 horizontally.

Details of ball joint mounts 350 for the parabolic reflector 202 on each side of yoke 312 are shown in FIG. 9. Ball joint housing 352 is attached to plate 354, which is welded to the top of yoke 312. Spindle 356 of the ball joint 350 extends through mounting member 358, which is fixedly attached to plate 314, embedded within the parabolic shape 304. Spindle 356 is secured in place on mounting member 358 through use of nut 360 and key 362. Another ball joint mount 350 is provided on the other side of the parabolic shape 304.

Through use of such ball joint mounts 350, the spindles 356 and mounting members 358 on each side of the parabolic reflector 202 need not be in perfect alignment for vertical pivoting of the parabolic reflector 202 without binding. The ball joint of the ball joint mount 350 allows the spindle 356 of each mount 350 to move for compensating any lack of alignment with the corresponding spindle 356 on the opposing mount 350. The ball joint mounts 350 allow the parabolic reflector 202 to be pivoted vertically with the force imparted by one finger when the vertical drive 300 is disconnected. As a result, only a small drive motor 318 is required for pivoting the reflector 202 vertically.

Figure 10:
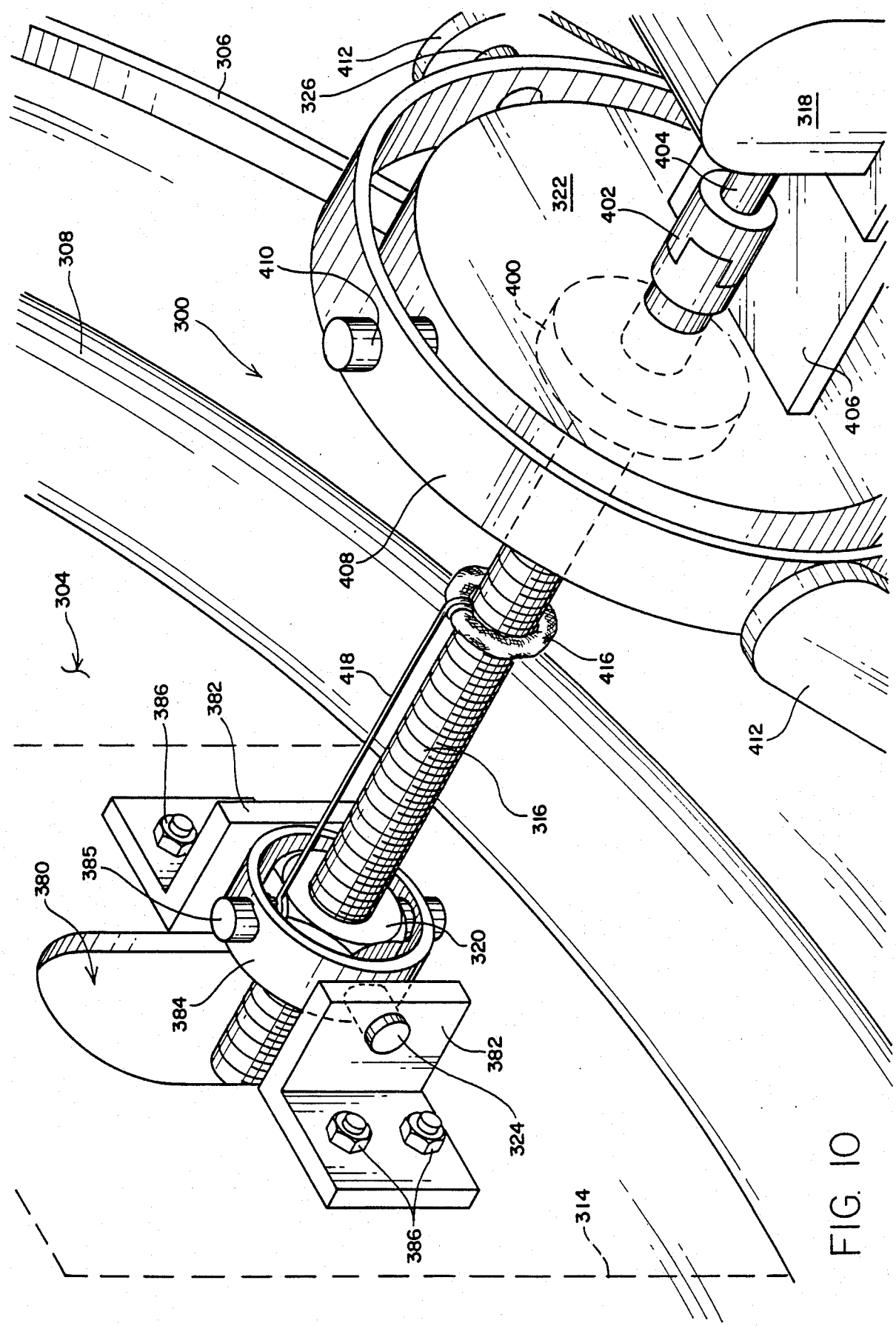
FIG. 10 is a perspective view of the drive mechanism and a portion of the parabolic reflector shown in FIGS. 7 and 8.
Figure 11:
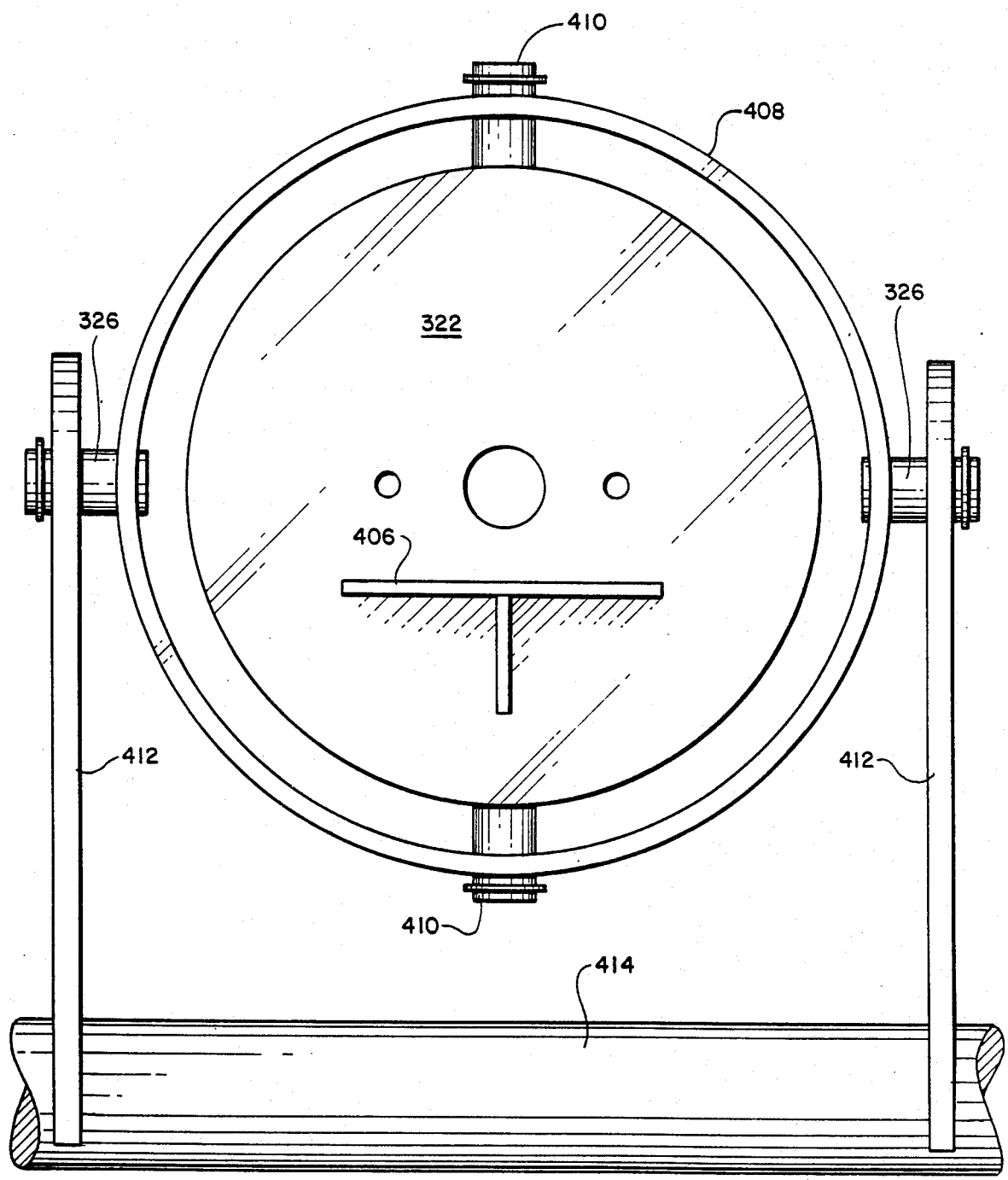
FIG. 11 is a front view of a portion of the drive mechanism shown in FIG. 10.

Further details of the vertical drive mechanism 300 are shown in FIGS. 10 and 11. As shown in FIG. 10, the screw 316 is threaded to nut 320 and extends through opening 380 extending through the parabolic shape 304 and the embedded steel plate 314. Support brackets 382 for ring 384 are fixedly attached to the embedded steel plate 314 by bolts 386. Ring 384 is mounted by pivots 324 to the support brackets 382.

Screw 316 passes through bearing 400, attached to plate 322, and is connected to vertical drive motor 318 by Lovejoy coupling 402 and shaft 404. The Lovejoy coupling 402 does not function as a universal joint, but is used only to couple the shaft 404 and the screw 316, which are roughly aligned end to end on the same axis. A rubber spyder inside the Lovejoy coupling 402 allows for small misalignments between the screw 316 and the shaft 404 and prevents transfer of vibration. Motor mount plate 406 is fixedly attached to the plate 322. As is best shown in FIG. 11, the plate 322 is pivotally attached to ring 408 by vertical pivots 410. Ring 408 is in turn attached to mounting members 412 by horizontal pivots 326. The mounting members 412 are in turn fixedly attached to pipe 414 forming a part of yoke 312.

As shown in FIG. 10, the screw 316 is automatically lubricated in operation of the drive 300 by means of oil impregnated fabric ring 416, which is attached to vertical pivot 385 for nut 320 by means of rod 418.

It should now be readily apparent to those skilled in the art that a solar tracking device and system capable of achieving the stated objects of the invention has been provided. The tracking devices 10 and 40 of this invention are able to find the sun from a wide angle off target in an improved manner and are sufficiently accurate under a wide variety of operating conditions to allow their use with a small solar heat receiving device. The solar tracking system incorporating the tracking devices 10 or 40 and the no-hunt logic circuit 100 eliminates constant oscillation across a desired attitude in operation of the solar tracking system. By maintaining a high differential of light levels between two sensors on any axis of tracking, the system of this invention provides precision tracking in both bright sun and hazy sun. Provision of a well sensor in the tracking device allows improved control of a heat transfer fluid pump 206 in a solar heating system 200 incorporating the tracking device 10. The drive mechanism 300 allows a small motor 318 to be used for pivoting the parabolic reflector 202.

It should further be apparent to those skilled in the art that various changes in form and details of the invention as shown and described may be made. It is intended that such changes be included within the spirit and scope of the claims appended hereto.

What is claimed is:

1. A solar tracking device, which comprises at least one shadow plate mounted above at least one support, a first pair of photoresponsive sensors mounted beneath said at least one shadow plate, said first photoresponsive sensor pair having a top directed at a bottom surface of said at least one shadow plate, a second pair of photoresponsive sensors mounted beneath said at least one shadow plate, said second photoresponsive sensor pair having a top directed at a bottom surface of said at least one shadow plate, said second pair of sensors being arranged along a second tracking axis forming an angle with a first tracking axis passing between said first pair of sensors, each of said sensors having a photosensitive element, each of said sensors having a cover positioned on the top of each sensor over the photosensitive element, and each of said sensors having an opening in said cover which is small in relation to the size of the photosensitive element for allowing sunlight to strike the photosensitive element, said sensors each being positioned so that the opening of each sensor is near an edge of said at least one shadow plate and beneath said at least one shadow plate, said first photoresponsive sensor pair being connected to supply input signals to a first drive circuit for a first electric motor mechanically coupled to orient said solar tracking device along said first tracking axis, and said second photoresponsive sensor pair being connected to supply input signals to a second drive circuit for a second electric motor mechanically coupled to orient said solar tracking device along said second tracking axis, said first and second drive circuits being configured to actuate said first and second electric motors respectively in response to differences in sunlight levels between the first and second photoresponsive sensor pairs.

2. The solar tracking device of claim 1 additionally comprising a fifth photoresponsive sensor surrounded by said first and second photoresponsive sensor pairs and being positioned in an elongated cylindrical enclosure having an open end pointed in the same direction as the tops of said first and second photoresponsive sensor pairs and positioned to be directed at the sun.

3. The solar tracking device of claim 2 in which said fifth photoresponsive sensor is connected to operate a pump for a heat exchange fluid when said fifth sensor is directed at the sun.

4. The solar tracking device of claim 1 in which the position of said first and second pair of sensors is adjustable relative to said at least one shadow plate so that the opening in the cover of each sensor is located under the shadow plate in a different distance from an edge of said shadow plate.

5. The solar tracking device of claim 1 in which said first pair of photoresponsive devices is connected to supply input signals to a first drive circuit for a first electric motor mechanically coupled to orient said solar tracking device in a first direction, said first pair of photoresponsive devices also each being connected to supply input signals to a first and a second latch, said first and second latches also being connected to receive a clocking input signal, said first and second latches being connected to supply output signals as inputs to a first logic gate, the clocking input signal being supplied as an additional input to said first logic gate, said first logic gate being connected to supply a disabling input to said first pair of photoresponsive sensors when the inputs are present at said first logic gate.

6. The solar tracking device of claim 5 in which said second pair of photoresponsive devices is connected to supply control inputs to a second drive circuit for a second electric motor mechanically coupled to orient said solar tracking device in a second direction, said second pair of photoresponsive devices also each being connected to supply input signals to a third and a fourth latch, said third and fourth latches also being connected to receive the clocking input signal, said third and fourth latches being connected to supply inputs to a second logic gate, the clocking input signal being supplied as an additional input to said second logic gate, said second logic gate being connected to supply a disabling input to said second pair of photoresponsive sensors when the inputs are present at said second logic gate.

7. The solar tracking device of claim 6 in which said first and second logic gates are NAND gates.

8. The solar tracking device of claim 5 in which said first logic gate is a NAND gate.

9. A no-hunt logic circuit, which comprises a first pair of photoresponsive devices connected to supply input signals to a first drive circuit for a first electric motor mechanically coupled to orient an object with respect to a light source in a first direction, said first pair of photoresponsive devices also each being connected to supply input signals to a first and a second latch, said first and second latches also being connected to receive a clocking input signal, said first and second latches being connected to supply output signals as inputs to a first logic gate, the clocking input signal being supplied as an additional input to said first logic gate, said first logic gate being connected to supply a disabling input to said first pair of photoresponsive sensors when the inputs are present at said first logic gate.

10. A no-hunt logic circuit of claim 9 in which a second pair of photoresponsive devices is connected to supply control inputs to a second drive circuit for a second electric motor mechanically coupled to orient said object in a second direction with respect to the light source, said second pair of photoresponsive devices also each being connected to supply input signals to a third and a fourth latch, said third and fourth latches also being connected to receive the clocking input signal, said third and fourth latches being connected to supply inputs to a second logic gate, the clocking input signal being supplied as an additional input to said second logic gate, said second logic gate being connected to supply a disabling input to said second pair of photoresponsive sensors when the inputs are present at said second logic gate.

11. The solar tracking device of claim 10 in which said first and second logic gates are NAND gates.

12. The solar tracking device of claim 9 in which said first logic gate is a NAND gate.

13. A solar energy system, which comprises a solar energy receiver, a first drive mechanism connected to pivot said solar energy receiver in a first direction to follow apparent solar motion, said first drive mechanism comprising a drive screw, a mating threaded member mounted on said drive screw and fixed to prevent rotation with respect to said drive screw, said mating threaded member being pivotably mounted on two orthogonally disposed pivots attached to said solar energy receiver, a drive motor coupled to turn said drive screw, said drive screw and drive motor being mounted on a support, said support being pivotally mounted on two orthogonally disposed pivots attached to a base which is fixed relative to said solar energy receiver, and a solar tracking device connected to control operation of said first drive mechanism.

14. The solar energy system of claim 13 in which said drive motor has a drive shaft connected to said drive screw by a coupling which compensates for axial misalignment between said drive shaft and said drive screw.

15. The solar energy system of claim 13 additionally comprising a means for supplying oil to said drive screw during operation of said drive mechanism.

16. The solar energy system of claim 13 additionally comprising a second drive mechanism connected to pivot said solar energy receiver in a second direction to follow apparent solar motion.

17. The solar energy system of claim 16 in which said solar tracking device comprises at least one shadow plate mounted above at least one support, a first pair of photoresponsive sensors mounted beneath said at least one shadow plate, said first photoresponsive sensor pair having a top directed at a bottom surface of said at least one shadow plate, a second pair of opposing photoresponsive sensors mounted beneath said at least one shadow plate, said second photoresponsive sensor pair having a top directed at a bottom surface of said at least one shadow plate, said second pair of sensors being arranged along a second tracking axis in the second direction forming an angle with a first tracking axis in the first direction passing between said first pair of sensors, each of said sensors having a photosensitive element, each of said sensors having a cover positioned on the top of each sensor over the photosensitive element, and each of said sensors having an opening in said cover which is small in relation to the size of the photosensitive element for allowing sunlight to strike the photosensitive element, said first pair of photoresponsive devices being connected to supply input signals to a first drive circuit for said drive motor, said first pair of photoresponsive devices also each being connected to supply input signals to a first and second latch, said first and second latches also being connected to receive a clocking input signal, said first and second latches being connected to supply output signals as inputs to a first logic gate, the clocking input signal being supplied as an additional input to said first logic gate, said first logic gate being connected to supply a disabling input to said first pair of photoresponsive sensors when the inputs are present at said first logic gate.

18. The solar tracking device of claim 17 in which said second pair of photoresponsive devices is connected to supply control inputs to a second drive circuit for a second motor mechanically coupled to orient said solar tracking device in the second direction, said second pair of photoresponsive devices also each being connected to supply input signals to a third and a fourth latch, said third and fourth latches also being connected to receive the clocking input signal, said third and fourth latches being connected to supply inputs to a second logic gate, the clocking input signal being supplied as an additional input to said second logic gate, said second logic gate being connected to supply a disabling input to a said second pair of photoresponsive sensors when the inputs are present at said second logic gate.

19. The solar energy system of claim 13 in which said solar energy receiver comprises a one piece parabolic reflector having a front surface and a rear surface, and a rigidity imparting ring fixedly attached to the rear surface of said parabolic reflector.

20. The solar energy system of claim 19 in which said parabolic reflector has an integrally formed rim having a greater thickness than an interior portion of said parabolic reflector surrounded by said rim.

21. The solar energy system of claim 20 in which said parabolic reflector, said rim and said rigidity imparting ring are fiberglass.

* * * * *